(12) United States Patent
Hill

(10) Patent No.: US 7,665,186 B2
(45) Date of Patent: Feb. 23, 2010

(54) HINGE WITH ANTI-SKEW FEATURES

(75) Inventor: Robert Milon Hill, Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 239 days.

(21) Appl. No.: 11/554,180

(22) Filed: Oct. 30, 2006

(65) Prior Publication Data
US 2008/0148521 A1    Jun. 26, 2008

(51) Int. Cl.
*E05D 11/06* (2006.01)
(52) U.S. Cl. .............................. 16/374; 16/303; 16/363
(58) Field of Classification Search ................... 16/303, 16/330, 337–340, 342, 363, 378, 388, 389; 248/291.1; 361/679.01–679.61; 455/575.3, 455/556.1, 556.2
See application file for complete search history.

(56) References Cited

U.S. PATENT DOCUMENTS

| | | | | | |
|---|---|---|---|---|---|
| 1,795,031 | A | * | 3/1931 | McCurdy | 160/81 |
| 2,315,801 | A | * | 4/1943 | Lave | 16/267 |
| 2,523,485 | A | * | 9/1950 | Weber | 384/190 |
| 3,381,332 | A | * | 5/1968 | Jerila et al. | 16/327 |
| 4,039,163 | A | * | 8/1977 | Shorey | 244/137.1 |
| 4,193,163 | A | * | 3/1980 | Lautenschlager | 16/250 |
| 4,799,291 | A | * | 1/1989 | Ankum et al. | 16/259 |
| 4,979,634 | A | * | 12/1990 | Begley | 220/242 |
| 5,038,437 | A | * | 8/1991 | Russell et al. | 16/266 |
| 5,210,906 | A | * | 5/1993 | Aihara et al. | 16/232 |
| 5,791,017 | A | * | 8/1998 | Kluting | 16/334 |
| 5,913,351 | A | * | 6/1999 | Miura | 16/340 |
| 6,018,847 | A | * | 2/2000 | Lu | 16/337 |
| 6,470,532 | B2 | * | 10/2002 | Rude | 16/335 |
| 6,581,893 | B1 | * | 6/2003 | Lu | 248/291.1 |
| 6,666,422 | B1 | * | 12/2003 | Lu et al. | 248/291.1 |
| 6,671,928 | B2 | * | 1/2004 | Huang | 16/340 |
| 6,708,046 | B1 | * | 3/2004 | Takagi | 455/575.3 |
| 6,813,813 | B2 | * | 11/2004 | Lu et al. | 16/342 |
| 6,883,206 | B2 | * | 4/2005 | Yang et al. | 16/337 |
| 6,918,159 | B2 | * | 7/2005 | Choi | 16/347 |
| 6,954,221 | B2 | * | 10/2005 | Wu | 361/681 |
| 7,240,402 | B2 | * | 7/2007 | Suzuki et al. | 16/330 |
| 7,275,283 | B2 | * | 10/2007 | Kistner et al. | 16/286 |

(Continued)

FOREIGN PATENT DOCUMENTS

GB       2423842       9/2006

OTHER PUBLICATIONS

International Search Report w/ Written Opinion, International Application No. PCT/US2007/074447, Mailing date: Nov. 26, 2007.

*Primary Examiner*—Victor Batson
*Assistant Examiner*—Roberta Delisle
(74) *Attorney, Agent, or Firm*—Coats & Bennett, P.L.L.C.

(57) ABSTRACT

A hinge for a clamshell-type phone includes first and second hinge sections with cooperative anti-skewing features to prevent skewing of the hinge in the open and/or closed positions. The first hinge section includes at least one anti-skew tab extending normal to the pivot axis of the hinge and a second hinge section includes at least one U-shaped anti-skew member to engage the anti-skew tab on the first hinge section in an open or closed position.

14 Claims, 10 Drawing Sheets

U.S. PATENT DOCUMENTS

| | | | |
|---|---|---|---|
| 2001/0052167 A1* | 12/2001 | Cho | 16/337 |
| 2003/0121124 A1* | 7/2003 | Chen | 16/339 |
| 2003/0163900 A1* | 9/2003 | Rude et al. | 16/337 |
| 2003/0221288 A1* | 12/2003 | Kim et al. | 16/337 |
| 2004/0000031 A1* | 1/2004 | Hsu | 16/339 |
| 2004/0049885 A1* | 3/2004 | Lu | 16/342 |
| 2004/0128795 A1* | 7/2004 | Lu et al. | 16/342 |
| 2004/0181909 A1* | 9/2004 | Kawamoto | 16/330 |
| 2005/0050687 A1* | 3/2005 | Shiba | 16/367 |
| 2005/0066474 A1* | 3/2005 | Hsu et al. | 16/330 |
| 2005/0091795 A1* | 5/2005 | Jeong et al. | 16/303 |
| 2005/0091796 A1* | 5/2005 | Lu et al. | 16/337 |
| 2005/0125950 A1* | 6/2005 | Su | 16/302 |
| 2005/0150080 A1* | 7/2005 | Lu et al. | 16/367 |
| 2005/0150081 A1* | 7/2005 | Gan | 16/367 |
| 2005/0283945 A1* | 12/2005 | Pan | 16/221 |

* cited by examiner

HINGE WITH ANTI-SKEW FEATURES

BACKGROUND

The present invention relates generally to a hinge for a clamshell-type phone or other portable electronic device and, more particularly, to a hinge having anti-skewing features to prevent skewing of the hinge sections relative to the pivot axis of the hinge.

Clamshell phones with two housing sections pivotably connected to one another are popular with many users. For clamshell-type phones, the construction of the hinge is an important design consideration to provide mechanical strength and durability to withstand years of use without breaking. Additionally, the feel of the hinge is important to the perceived quality of the phone. In this regard, the hinge should be designed to prevent wobble. Wobble is the skewing of the clamshell halves when a force is applied parallel to the axis of the rotation. Previously, attempts to reduce or minimize wobble in a hinge for a clamshell design have included increasing the clamping force on the hinge or reducing tolerances. These efforts have only been partially successful in solving the problem. Wobble is inherent in many hinge designs and previous measures only masked the problem.

SUMMARY

The present invention relates to a hinge for a clamshell-type cellular phone or other electronic device. The hinge comprises first and second hinge sections connected together for pivotal movement relative to one another between open and closed positions. An anti-skewing tab on the first hinge section extends normal to a pivot access of the hinge. A U-shaped anti-skew member on the second hinge section engages with the anti-skew tab on the first hinge section when the hinge is in the open or closed position. Two sets of anti-wobble features may be provided for both the open and closed positions. The anti-wobble features provide a mechanical stop to resist movement of the hinge caused by force parallel to the axis of rotation.

In one exemplary embodiment, the hinge comprises a stamped metal frame hinge. The anti-wobble features are formed as integral parts of the hinge sections.

DETAILED DESCRIPTION

The present invention comprises a hinge 10 for a clamshell-type cellular phone or other electronic device, which is indicated generally by the numeral 100. While the illustrative embodiment illustrates a cellular phone 100, those skilled in the art will readily appreciate that the present invention can be applied to other electronic devices, such as a personal digital assistant or media player. The cellular phone 100 includes first and second housing sections 102, 104. Hinge 10 pivotally connects the first and second housing sections 102, 104 so as to be movable relative to one another between open and closed positions. As described in greater detail below, the hinge 10 is designed to prevent or resist skewing relative to the pivot axis X of the hinge 10.

Figure 1:
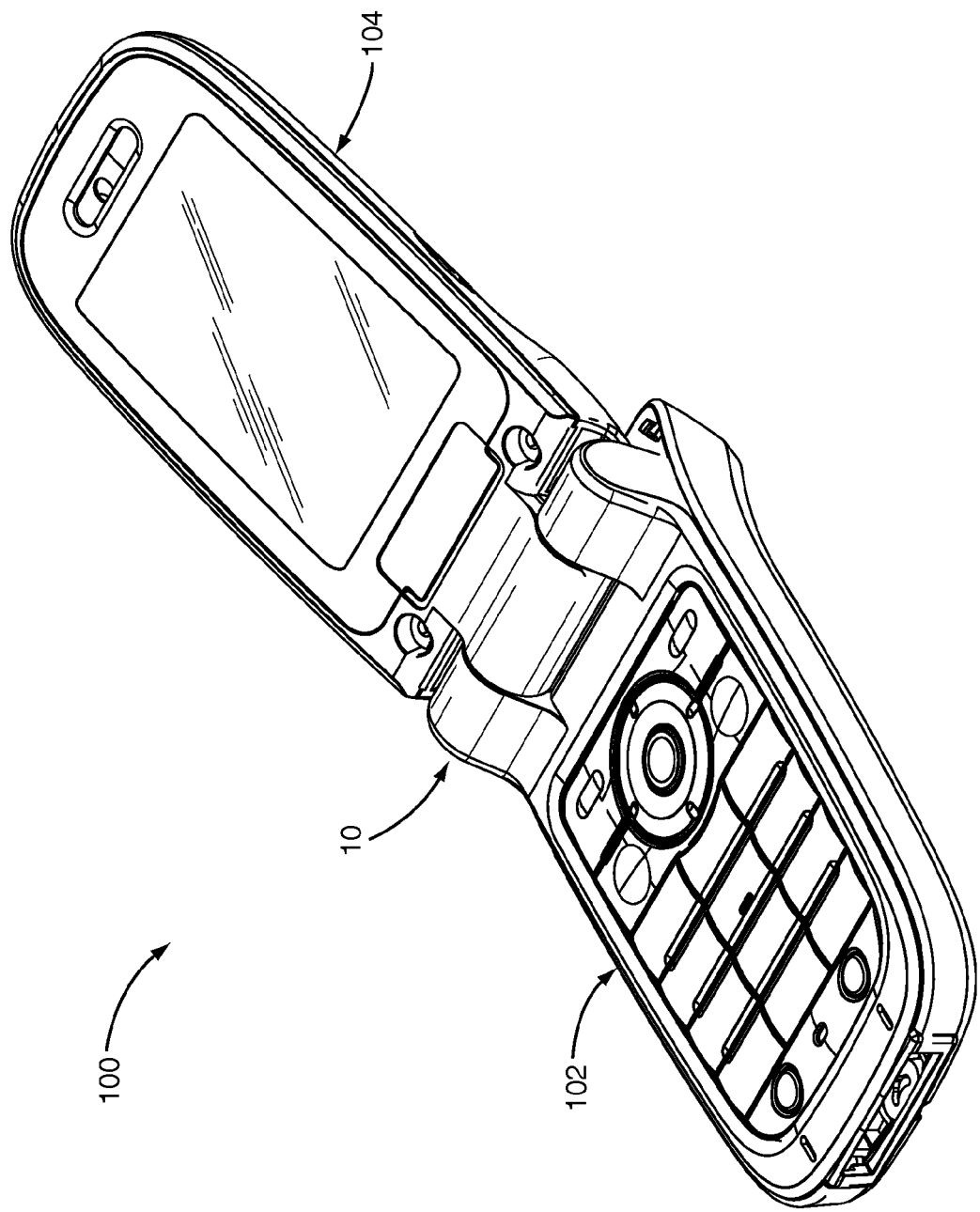
FIG. 1 illustrates a clamshell-type cellular phone including a hinge according to one exemplary embodiment of the invention.
Figure 2:
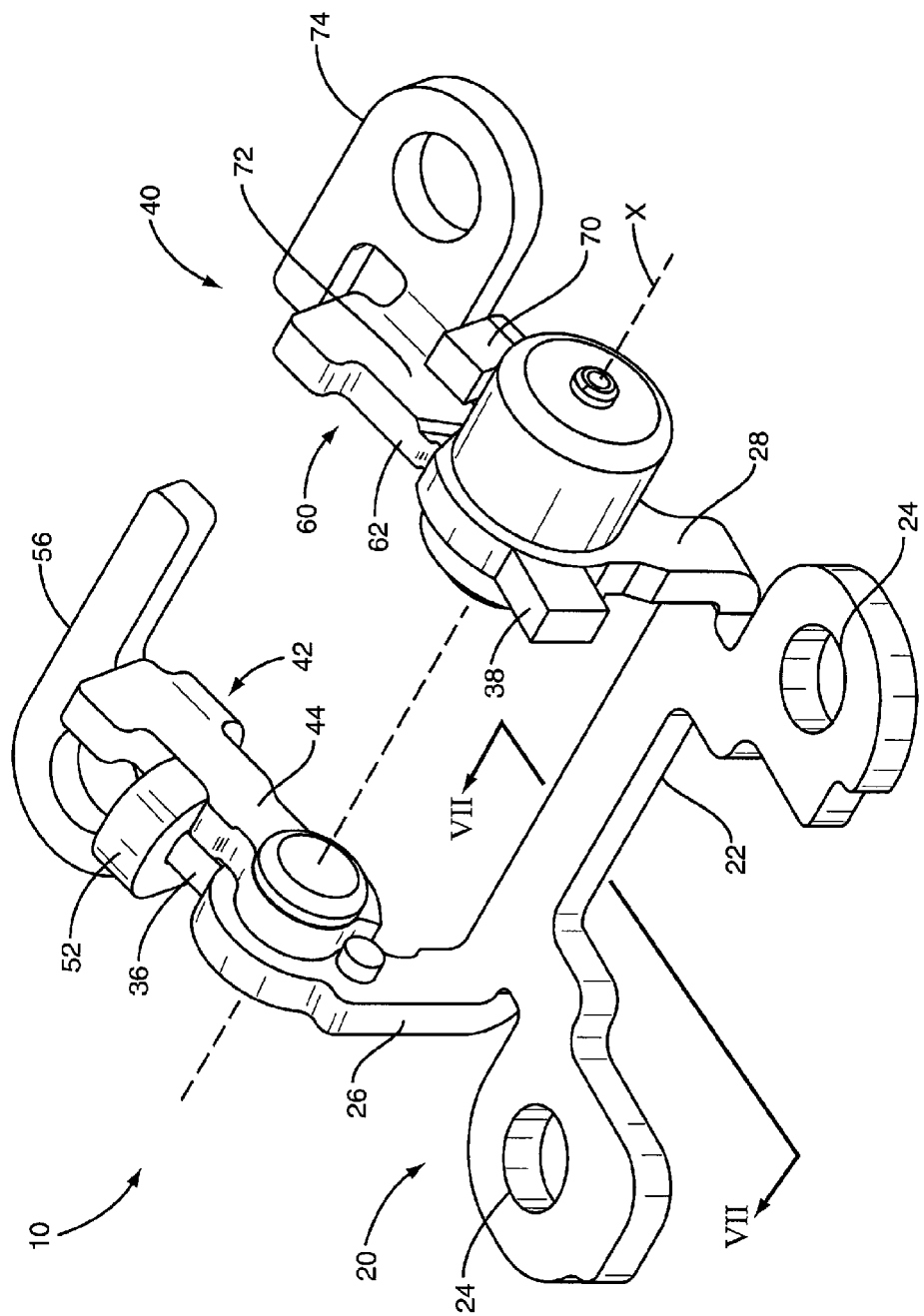
FIG. 2 illustrates an exemplary hinge structure in an open position.
Figure 3:
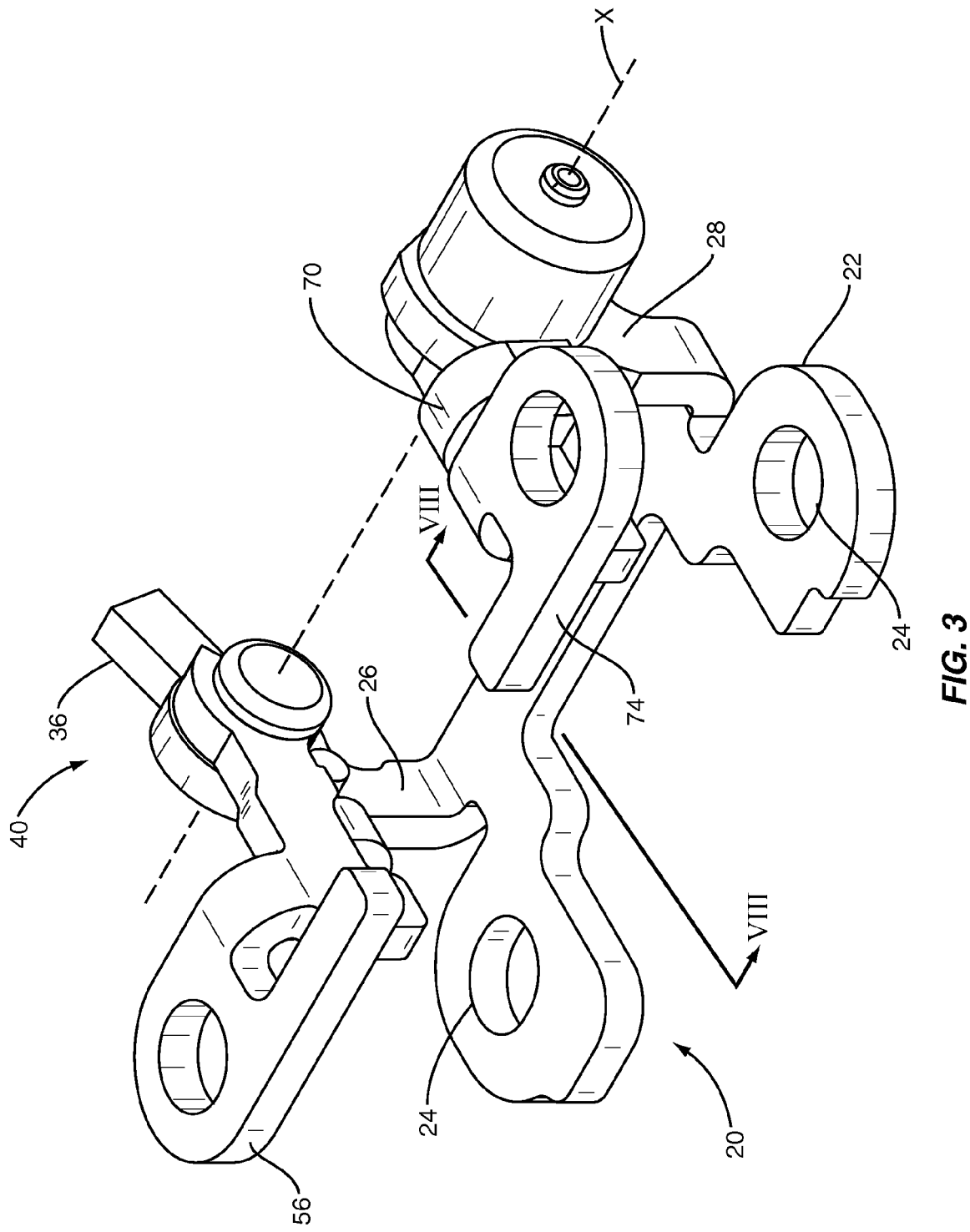
FIG. 3 illustrates the exemplary hinge structure in a closed position.

FIGS. 2-6 illustrate an exemplary hinge 10 according to the present invention. The hinge 10 comprises a first hinge section 20 and a second hinge section 40 pivotally connected to the first hinge section 20. The first and second hinge sections 20, 40 rotate relative to one another about the pivot axis X between open and closed positions. FIG. 2 illustrates the hinge 10 in the open position. FIG. 3 illustrates the hinge in the closed position.

Figure 4:
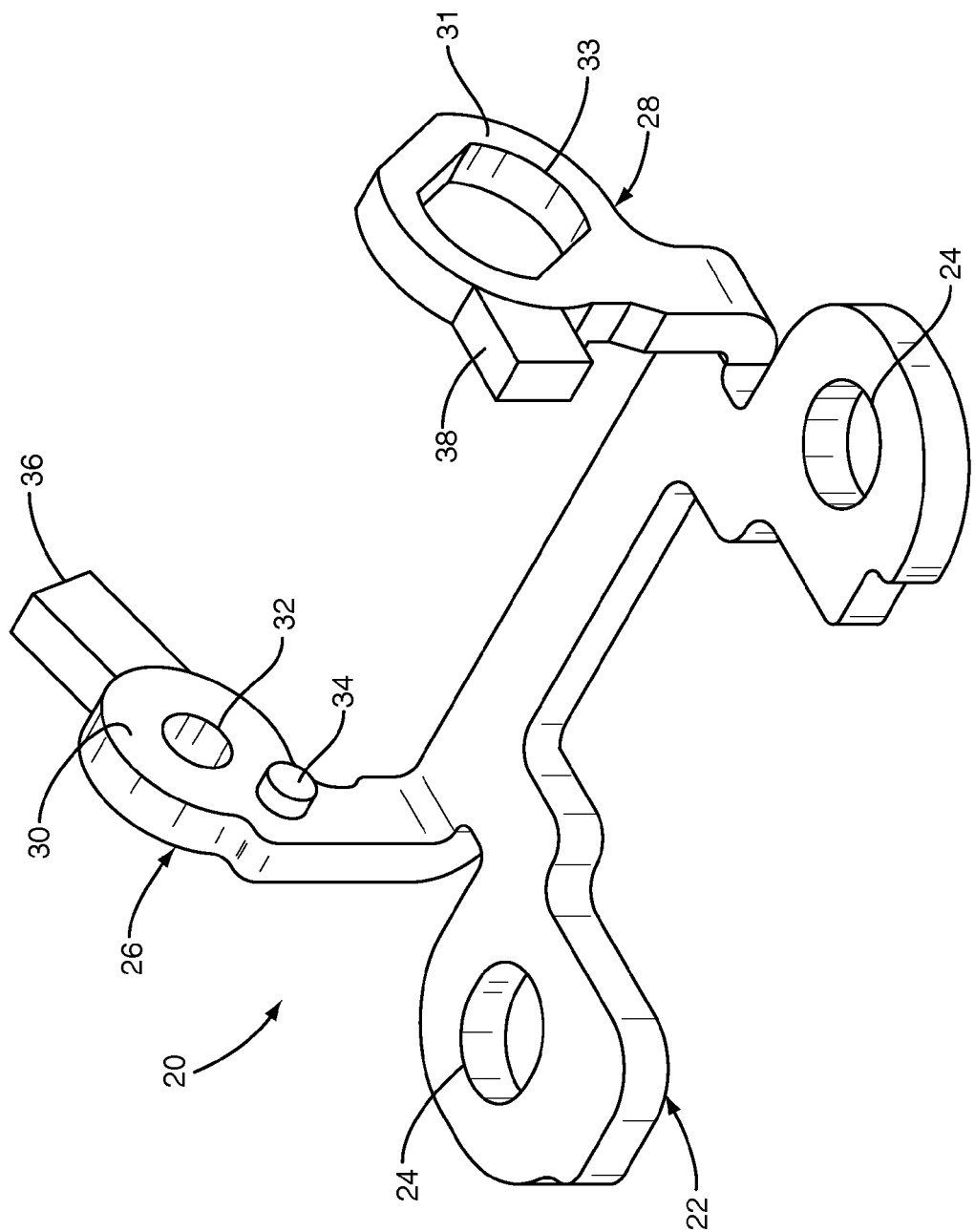
FIG. 4 illustrates a first hinge section of the exemplary hinge as seen from the top.

The first hinge section 20, shown in FIG. 4, comprises a base 22 and a pair of arms 26, 28 extending outwardly from the base 22. Together, the base 22 and arms 26, 28 form a U-shaped frame. The base 22 includes a pair of openings 24 that fit over the corresponding posts (not shown) on the first housing section 102. The posts locate the first hinge section 20 and prevent the first hinge section 20 from shifting relative to the housing section 102. The arms 26, 28 each include a collar 30, 31 with an opening 32, 33 formed therein. The openings 33 are aligned along the pivot axis X. A stop member 34, 35 projects from the inside surface of each arm 26, 28. The stop member 34 limits rotational movement of the first and second hinge sections 20, 40 relative to one another as will be hereinafter described. Anti-skew tabs 36, 38 extend from the collars 30 of the first and second arms 26, 28. As will be hereinafter described, the anti-skew tabs 36, 38 form a first cooperative part of an anti-skewing mechanism.

Figure 5:
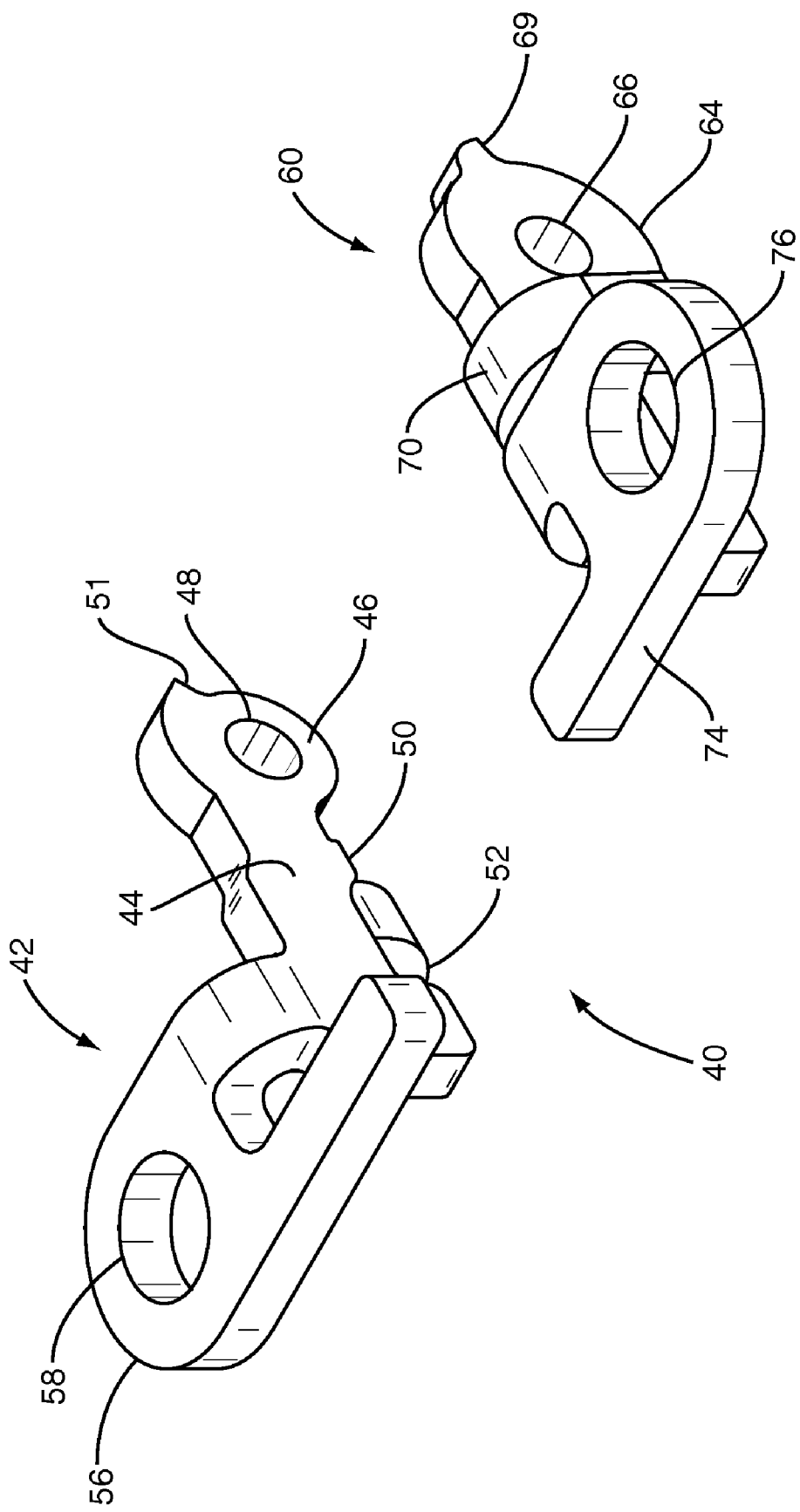
FIG. 5 illustrates a second hinge section of the exemplary hinge as seen from the top.
Figure 6:
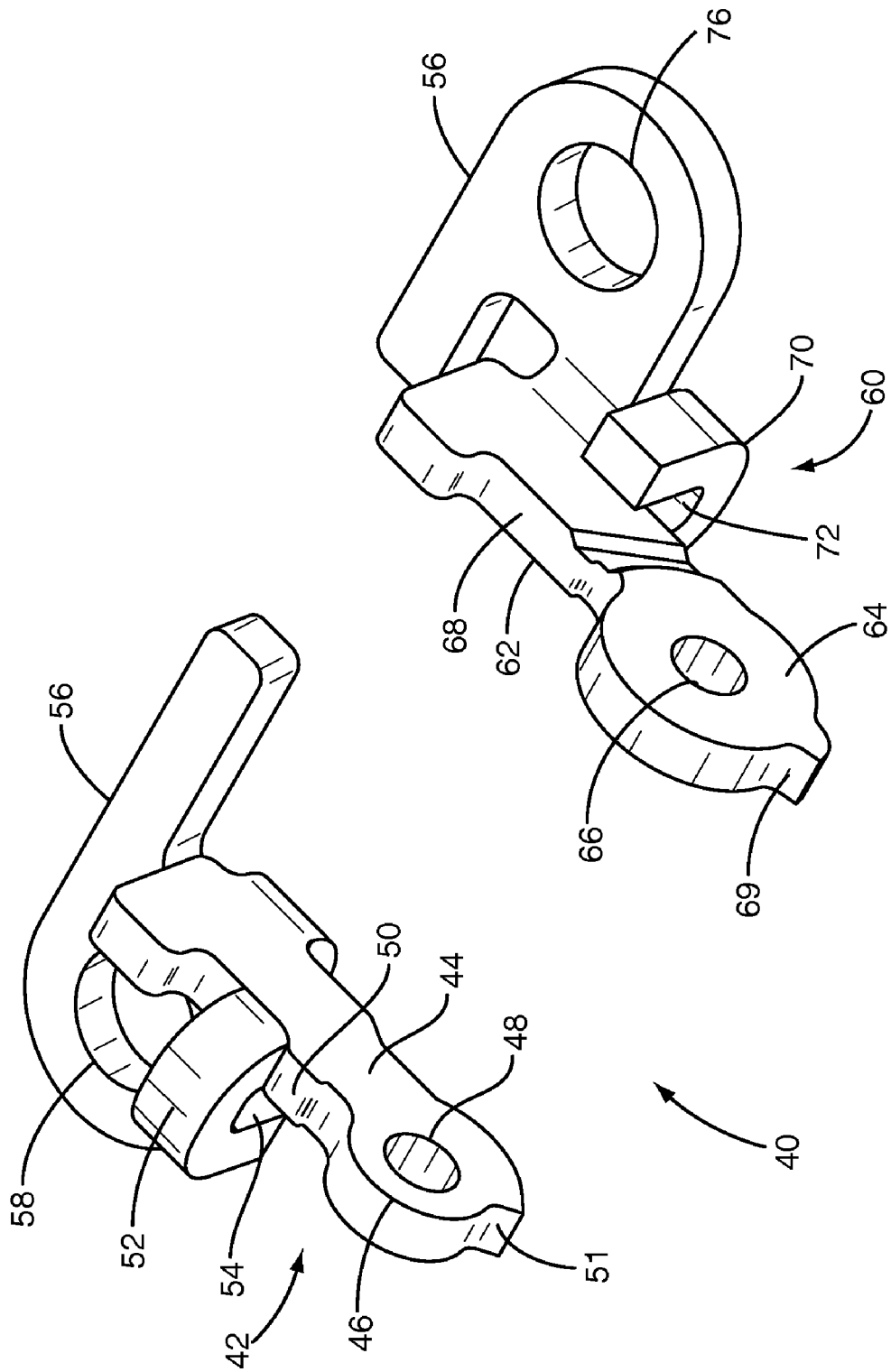
FIG. 6 illustrates the second hinge section of the exemplary hinge as seen from the bottom.

The second hinge section 40, shown in FIGS. 5 and 6, comprises two similarly-formed arm members 42, 60. The first arm member 42 includes a swing arm 44 and wing section 56. Swing arm 44 includes a collar 46 having an opening 48 for pivotally connecting the first arm member 42 to a first arm 26 on the first hinge section 20. Wing section 56 includes an opening 58 that engages with a post on the second housing section 104 to locate the arm member 42 and prevent the arm member 42 from shifting. Contact surfaces 50, 51 engage the stop 34 on the first arm 26 of the first hinge section 20 to limit rotational movement of the arm member 42. A U-shaped anti-skew member 52 connects to the swing arm 44 and defines an anti-skew channel 54. Anti-skew member 52 is configured to engage the anti-skew tab 36 on the first arm 26 of the first hinge section 20 when the hinge 10 is in the open position. More particularly, the anti-skew tab 36 becomes entrapped in the anti-skew channel 54 of the U-shaped member 52 when the hinge is in the open position. This entrapment of the anti-skew tab 36 on the first hinge section 20 with the U-shaped member 52 on the second hinge section 40 prevents skewing of the first and second hinge sections.

The second arm member 60, shown in FIGS. 5 and 6, is designed in a similar fashion to the first arm member 42, but provides anti-skew protection in the closed position. The second arm member 60 comprises a swing arm 62 and wing section 74 as previously described. Swing arm 62 includes a collar 64 and opening 66 for pivotally connecting the swing arm 62 to the second arm 28 of the first hinge section 20. Wing section 74 includes an opening 76 to engage a post on the second housing section 104. Arm member 60 includes surfaces 68, 69 that contact the stop member 35 on the second arm 28 of the first hinge section 20 in the open and closed positions respectively. Thus, contact surfaces 68, 69, in cooperation with stop 35, limit the rotational movement of the arm member 60 relative to the first hinge section 20. A U-shaped anti-skew member 70 connects to the swing arm 62 and defines an anti-skew channel 72 to engage with the anti-skew tab 38 on the second arm 28 of the first hinge section 20. More particularly, the anti-skew tab 38 becomes entrapped in the anti-skew channel 72 defined by the U-shaped member 70 when the hinge 10 is in the closed position.

Figure 8:
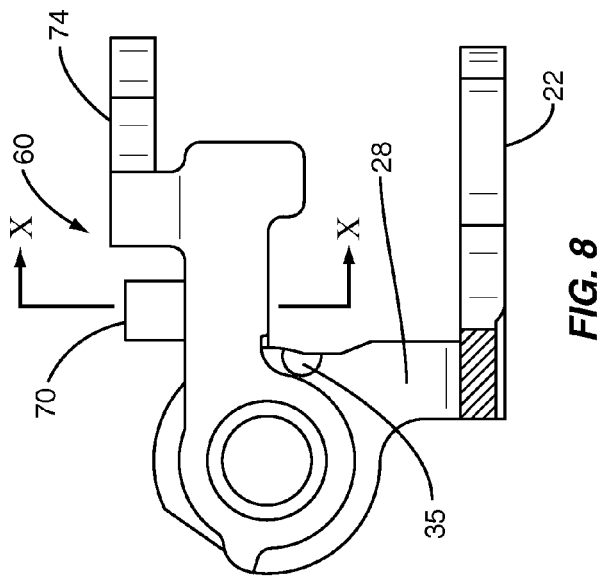
FIG. 8 is a section view of the hinge in a closed position taken along line VIII-VIII of FIG. 3.
Figure 10:
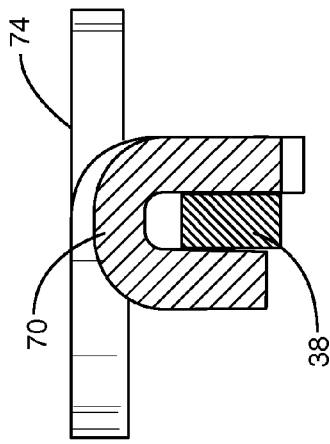
FIG. 10 is a section view of the hinge in a closed position taken along line X-X in FIG. 8.
Figure 7:
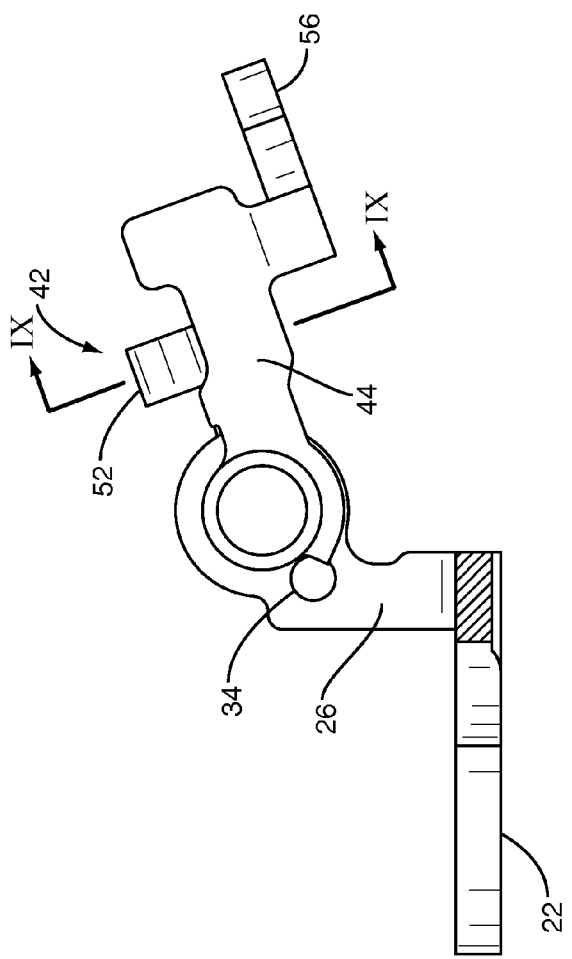
FIG. 7 is a section view of the hinge in an open position taken along line VII-VII of FIG. 2.
Figure 9:
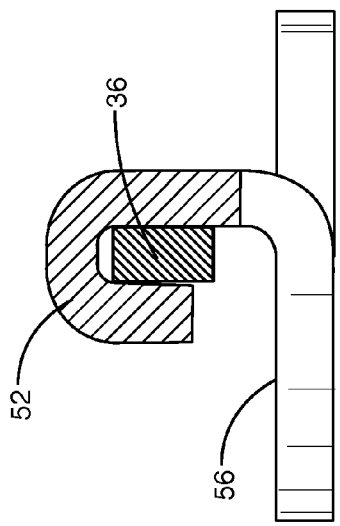
FIG. 9 is a section view of the hinge in an open position taken along line IX-IX in FIG. 7.

FIGS. 7 and 8 are section views of the hinge in the open and closed positions, respectively. FIG. 7 illustrates the anti-skew tab 36 engaged in the channel 54 of the U-shaped anti-skew member 52 when the hinge 10 is in the open position. FIG. 9 is cross-section taken along line IX-IX of FIG. 7 and shows the engagement of the anti-skew tab 36 in the channel 54 of the anti-skew member 52. Similarly, FIG. 8 illustrates the anti-skew tab 38 engaged in the channel 72 of the U-shaped anti-skew member 70 when the hinge is in the closed position. FIG. 10 is cross-section taken along line IX-IX of FIG. 7 and shows the engagement of the anti-skew tab 38 in the channel 72 of the anti-skew member 70.

Figure 11:
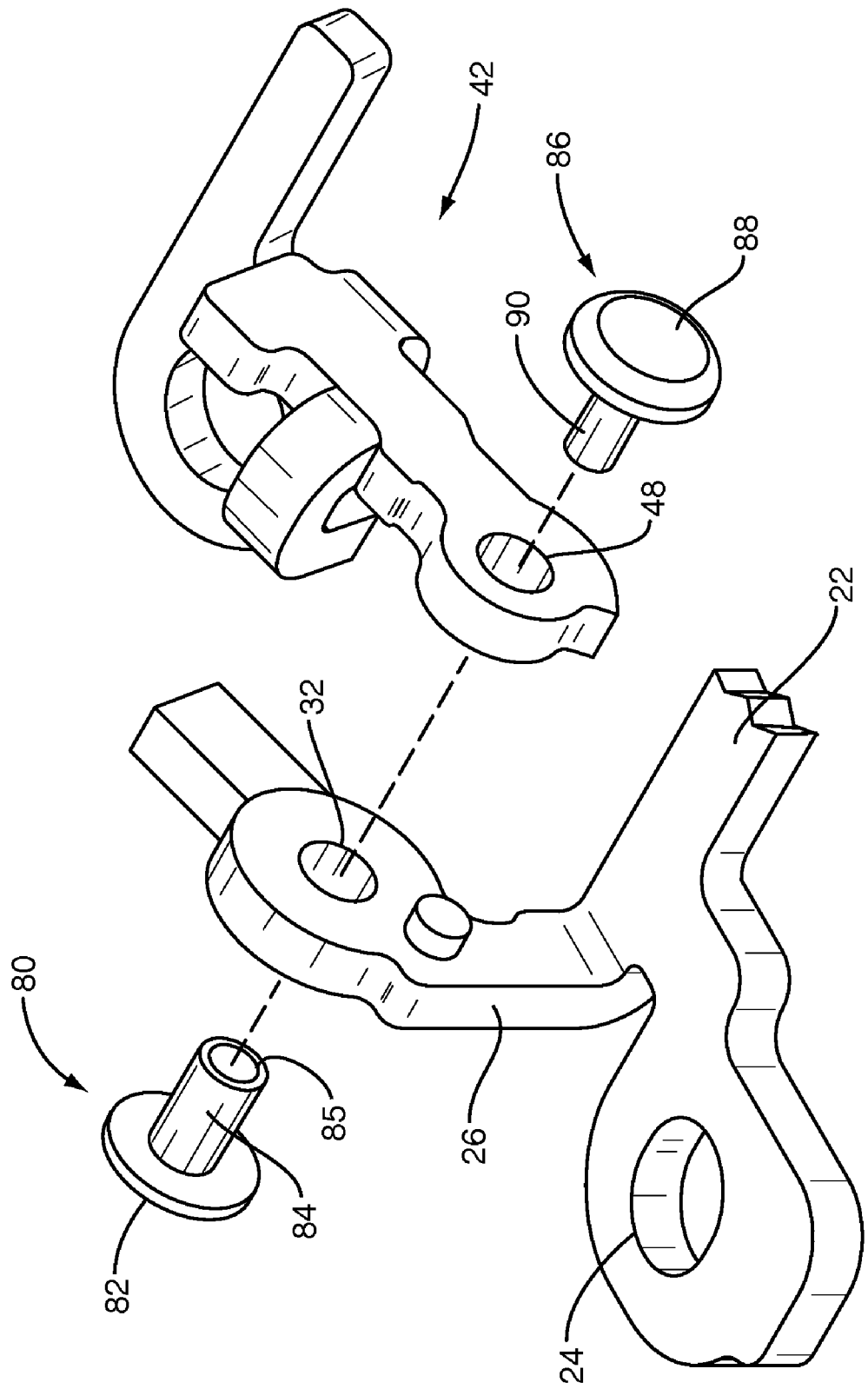
FIG. 11 is a detail view of the hinge showing the connection between the first and second hinge sections.

FIG. 11 illustrates an exemplary method for pivotally connecting the hinge sections 20, 40. As shown in FIG. 9, arm member 42 is pivotally connected to the arm 26 of hinge section 20 by hinge pins 80, 86. Hinge pin 80 includes a cap 82 and a shaft 84 with an axial bore 85. Hinge pin 86 includes a cap 88 and a shaft 90. The axial bore 85 in the shaft 84 of hinge pin 80 is sized to provide an interference fit with the shaft 90 of hinge pin 86. The hinge pins 80, 86 pass through the aligned openings 32, 48 and are press fit together to secure the arm member 42 to the arm 26.

Figure 12:
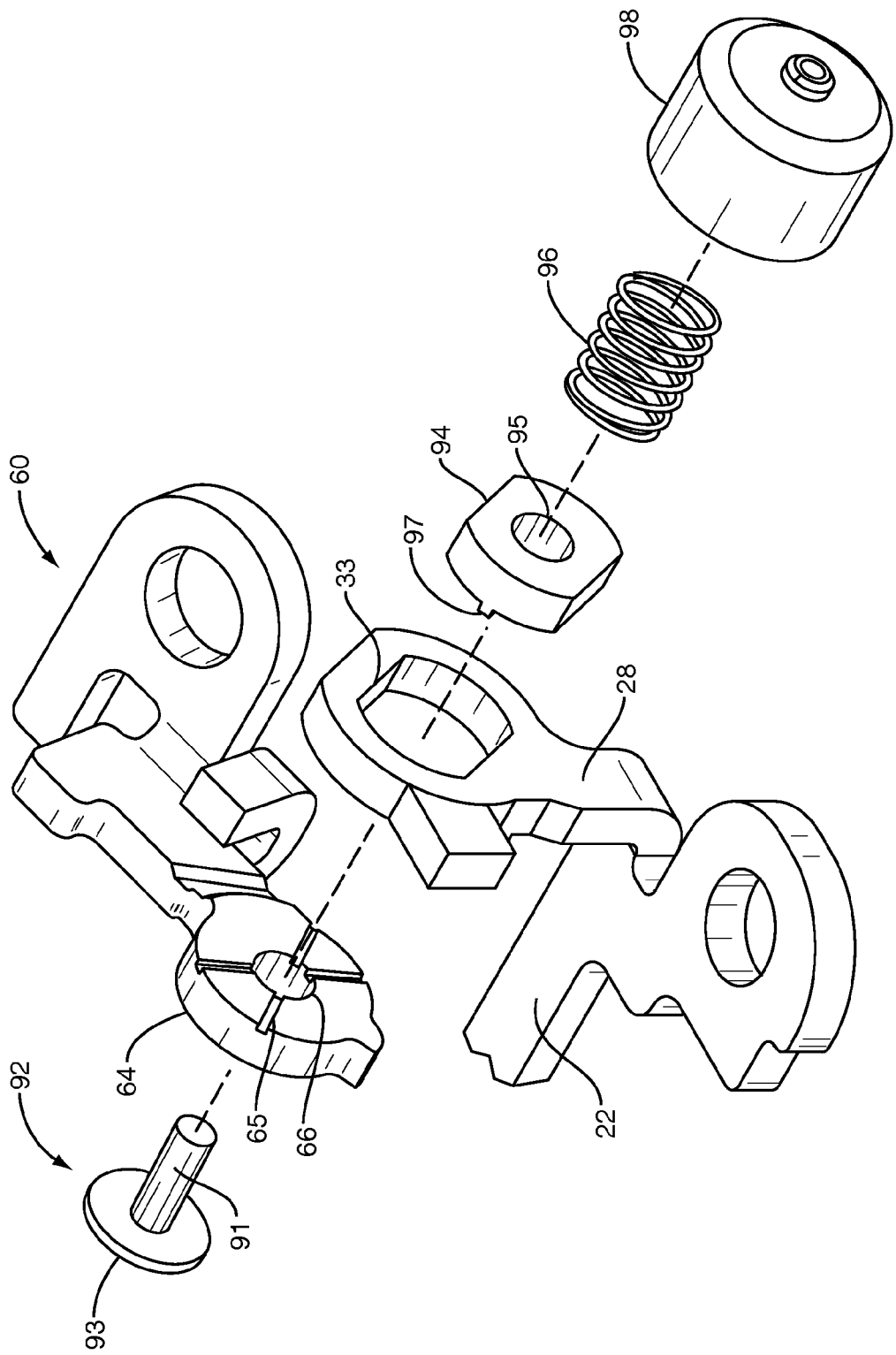
FIG. 12 is a detail view of the hinge showing the connection between the first and second hinge sections.

Referring to FIG. 12 arm member 60 of hinge section 40 is pivotally connected to arm 28 of hinge section 20 by a hinge pin 92, pressure plate 94, compression spring 96 and cover 98. Hinge pin 92 includes a shaft 91 and end cap 93. The shaft 91 of the hinge pin 90 passes through the aligned openings 33, 66 in hinge section 20 and arm member 60 respectively. Pressure plate 94 is received in the opening 33 in the arm 28 of hinge section 20. The pressure plate 94 and opening 33 are shared to prevent relative rotation of the parts. The shaft 91 of the hinge pin 92 passes through a central opening 95 in the pressure plate 94. Compression spring 96 surrounds the protruding end of the shaft 91. Cover 98 press fits onto the end of shaft 91. When the cover 98 is pressed onto the end of the shaft 91, spring 96 is compressed between the pressure plate 94 and cover 98. Thus, the spring 96 pushes against the plate and forces the pressure plate 94 into contact with the collar 64 of arm member 60. The frictional contact between the pressure plate 94 and the collar 64 of the arm member 60 provides some resistance to rotational movement. In a preferred embodiment, the pressure plate 94 includes a protruding rib 97 that engages corresponding grooves 65 formed on the collar 64 in the open and closed positions. The rib 97 and grooves 65 thus provide a detent mechanism.

Figure 13:
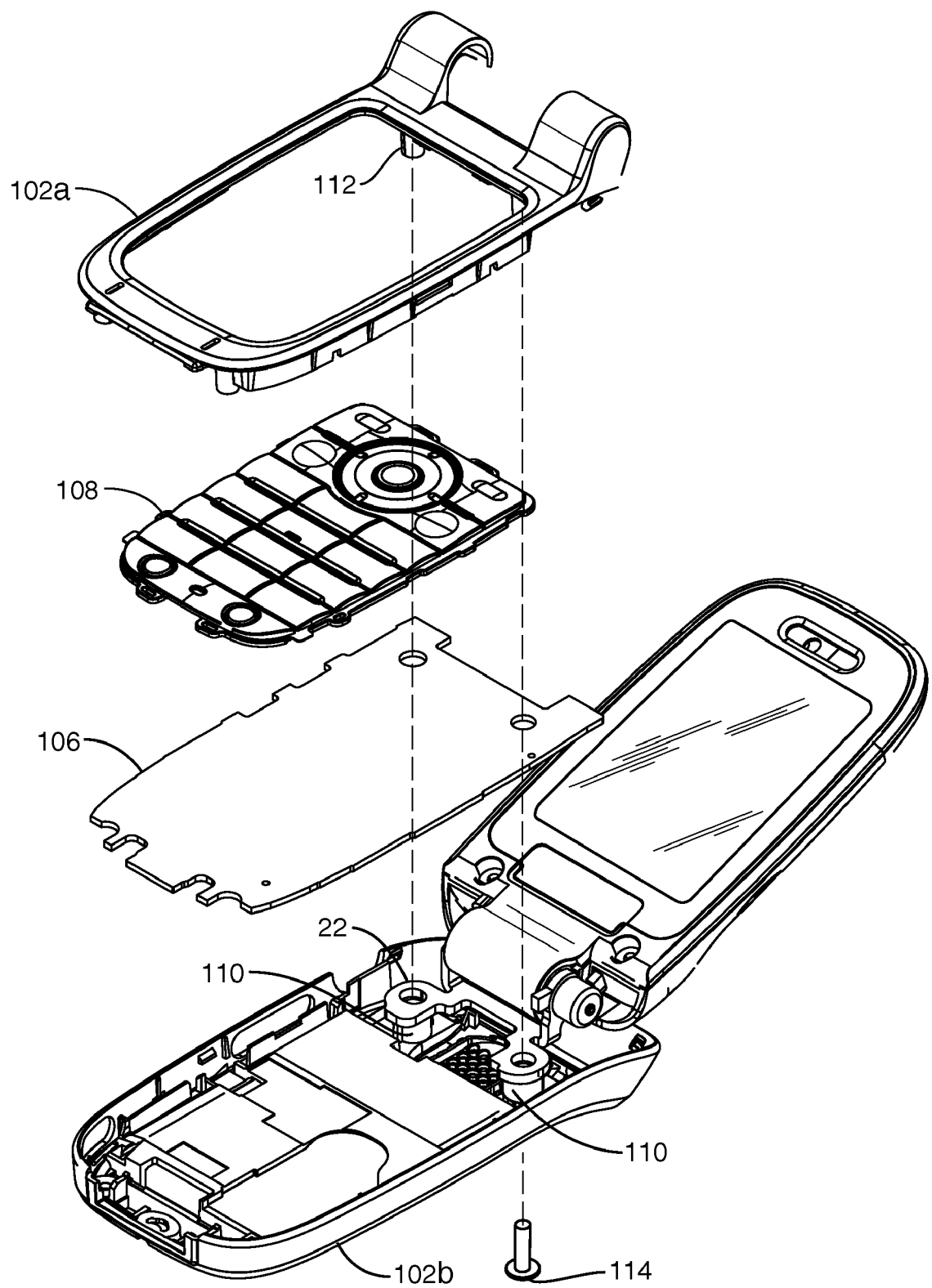
FIG. 13 is an exploded perspective showing the mounting of the hinge in the housing of a cellular telephone.

FIG. 13 illustrates one method of securing the hinge 10 to the housing section 102. Housing section 102 is shown in an exploded view in FIG. 9. The housing section 102 comprises an upper portion 102a and a lower portion 102b that contain a printed circuit board 106 and keypad assembly 108. The lower portion 102b of housing section 102 includes posts 110 supporting the base 22 of hinge section 20. Posts 112 on the upper portion 102a of the housing pass through the openings 24 in the base 22 of the first hinge section 20. Posts 112 include a shoulder (not shown) that contacts the top surface of the base 22. The upper and lower portions 102a, 102b of housing section 102 are held together by screws 114. Screws 114 pass upwardly through the posts 110 in the lower portion 102b and thread into openings in the ends of posts 112 in the upper portion 102a. When the screws 114 are tightened, the base 22 of hinge section 20 is clamped or compressed between the posts 110, 112. The same method can be used to secure the second hinge section 40 to housing section 104.

Those skilled in the art will appreciate that the present invention can be used in other types of portable electronic devices with clamshell-type housing, such as personal digital assistants, media players, etc.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A hinge of a portable electronic device comprising:
  first and a second hinge sections connected together for pivotal movement relative to one another between open and closed positions;
  an anti-skew tab on the first hinge section extending normal to a pivot axis of said hinge; and
  a U-shaped anti-skew member on the second hinge section having two opposing members to entrap the anti-skew tab there between to prevent skewing of the second hinge section relative to the pivot axis.

2. The hinge of claim 1 wherein the U-shaped anti-skew member engages with the anti-skew tab on the first hinge section when the second hinge section is in the closed position.

3. The hinge of claim 1 wherein the U-shaped anti-skew member engages with the anti-skew tab on the first hinge section when the second hinge section is in the open position.

4. The hinge of claim 1 further including first and second anti-skew tabs and first and second anti-skew members, wherein the first anti-skew tab engages with the first anti-skew member in the open position and wherein the second anti-skew tab engages with the second anti-skew member in the closed position.

5. The hinge of claim 1 wherein the first hinge section comprises a unitary member including said anti-skew tab.

6. The hinge of claim 5 wherein the second hinge section comprises first and second arms, and wherein said U-shaped anti-skew member is integrally formed with at least one of said first and second arms.

7. A portable electronic device comprising:
  a first housing section;
  a second housing section; and
  a hinge pivotally connecting the first and second housing sections for relative movement between open and closed positions, said hinge including a first hinge section having a first anti-skew tab and a second hinge section having a first U-shaped anti-skew member, the U-shaped anti-skew member having two opposing members to entrap the anti-skew tab there between in either the open or closed position to prevent skewing of the first and second hinge sections.

8. The portable electronic device of claim 7 wherein the U-shaped anti-skew member engages with the anti-skew tab on the first hinge section when the second hinge section is in the closed position.

9. The portable electronic device of claim 7 wherein the U-shaped anti-skew member engages with the anti-skew tab on the first hinge section when the second hinge section is in the open position.

10. The portable electronic device of claim 7 wherein said first hinge section further includes a second anti-skew tab and said second hinge section further includes a second U-shaped anti-skew member, wherein the first anti-skew tab engages with the first anti-skew member in the open position and wherein the second anti-skew tab engages with the second anti-skew member in the closed position.

11. The portable electronic device of claim 7 wherein the first hinge section comprises a unitary member including said anti-skew tab.

12. The portable electronic device of claim 11 wherein the second hinge section comprises first and second arms, and wherein said U-shaped anti-skew member is integrally formed with at least one of said first and second arms.

13. The hinge of claim 1 wherein the anti-skew tab is moveable relative to the U-shaped anti-skew member to be at least partially disposed between said opposing members.

14. The portable electronic device of claim 7 wherein the anti-skew tab is movable relative to the U-shaped anti-skew member to be at least partially disposed between said opposing members.

\* \* \* \* \*

UNITED STATES PATENT AND TRADEMARK OFFICE
CERTIFICATE OF CORRECTION

PATENT NO. : 7,665,186 B2 Page 1 of 1
APPLICATION NO. : 11/554180
DATED : February 23, 2010
INVENTOR(S) : Hill It is certified that error appears in the above-identified patent and that said Letters Patent is hereby corrected as shown below:

In col. 2, line 45, change to read -- from the collars 30, 31 --

In col. 3, line 36, change "FIG. 9" to -- FIG. 11 --

Signed and Sealed this

Thirteenth Day of April, 2010

David J. Kappos
*Director of the United States Patent and Trademark Office*